United States Patent [19]
Pringle

[11] Patent Number: 5,070,336
[45] Date of Patent: Dec. 3, 1991

[54] RADAR GUIDANCE SYSTEM CORRECTING HARDWARE INDUCED CHANNEL-TO-CHANNEL PHASE ERRORS

[75] Inventor: Richard C. Pringle, Van Nuys, Calif.

[73] Assignee: Hughes Aircraft Company, Los Angeles, Calif.

[21] Appl. No.: 653,527

[22] Filed: Feb. 11, 1991

[51] Int. Cl.$^5$ ............................................. G01S 13/44
[52] U.S. Cl. .................................. 342/151; 342/152; 342/174
[58] Field of Search ................. 342/151, 152, 165, 174

[56] References Cited

U.S. PATENT DOCUMENTS

| | | | |
|---|---|---|---|
| 4,368,468 | 1/1983 | Lisle et al. | 342/152 |
| 4,642,642 | 2/1987 | Uurtamo | 342/165 |
| 4,994,810 | 2/1991 | Sinsky | 342/151 |
| 5,014,064 | 5/1991 | Spencer et al. | 342/152 |

Primary Examiner—Mark Hellner
Attorney, Agent, or Firm—C. D. Brown; R. M. Heald; W. K. Denson-Low

[57] ABSTRACT

A phase dependent radar guidance system, the receiver (18) of which separates returns into a channel (22) where returns are summed (S) and a further channel (24) where the returns are differenced (jD). The S and jD signals are combined (26) and formed into two further channels as $S+jD$ and $s-jD$, both of which are passed through AGC controlled amplifiers (28, 30) into a phase angle detector (32) which provides the target (14) angle $\beta$ to boresight (20). A test signal is applied to the receiver (18) with $jD=0$, the output value of the phase angle detector (32) for various values of AGC attenuation are stored by a digital processor (34), and the processor (34) modifies measured target phase value with the stored values to correct for AGC amplifier-induced errors.

4 Claims, 2 Drawing Sheets

RADAR GUIDANCE SYSTEM CORRECTING HARDWARE INDUCED CHANNEL-TO-CHANNEL PHASE ERRORS

BACKGROUND OF THE INVENTION

1. Field of the Invention

The present invention relates generally to a radar guidance system, and, more particularly, to a phase dependent guidance system in which hardware induced phase differences are compensated for without a loss of guidance performance

2. Description of Related Art

A radar guidance and tracking system includes, in its major elements, a high frequency oscillator controlled to produce pulses of relatively high power and relatively short duration. These pulses are applied to a highly directional antenna and the antenna is directed to transmit the pulses towards a target or towards a region in which a target is sought. The receiver, which may be interconnected with the same antenna as the transmitter, is controlled to interconnect the antenna to the receiver during the interval between transmitted power pulses in order to receive reflected energy from a target. Monitoring the antenna direction and timing of reflected pulse returns enables determination of location and range of a target for guidance or tracking purposes.

Target angle (i.e., angle from a reference line such as boresight) in certain guidance systems is determined by channel-to-channel phase differences. However, this requires that channel-to-channel phase matching over the entire range of receiver gain be achieved, otherwise hardware phase differences in the channels can introduce an error which could be prohibitive. Such phase dependence guidance systems produce sum (S) and difference (D) signals from data received at the antenna for each channel. More particularly, the signals for each channel are processed to provide S+jD and S-jD signals where the operator j indicates a 90 phase orientation from the S signals.

One technique that has been used in the past to correct for hardware phase differences is to switch these signals to alternate channels every data collection period. By doing this, the phase difference due to the target angle changes sign resulting in phase differences due to the hardware staying constant. Measured phase differences can then be subtracted for each pair of data collection intervals resulting in substantial nulling of any hardware phase differences. This technique, unfortunately, requires a target angle not varying significantly between data collection periods which is not the usual experience.

SUMMARY OF THE INVENTION

It is a primary aim and object of the present invention to provide a radar guidance system having two channels where the phase difference between the two channels establishes the angle of the target to the antenna boresight and hardware generated phase differences between the channels are eliminated.

Another object is the provision in accordance with the previous object of a guidance system where channel-to-channel phase differences are measured as a function of automatic gain control attenuation and are used to correct processed target angle data.

In accordance with the described radar guidance system, a plurality of channel-to-channel phase differences are obtained for the phase dependent radar guidance system while each of the channels are provided with a common test signal consisting of solely the S data (i.e., the amplitude of jD being set to zero). Accordingly, any detected phase difference in the channels is strictly the result of hardware and is not signal related. Next, using the signal processing customarily employed to determine phase differences for target angles, phase difference are then measured with the different phase measurements being taken at various AGC attenuation settings This provides a set of phase differences versus AGC attenuation values which can then be applied to the system processor in order to effect target angle correction through eliminating hardware derived phase errors.

DESCRIPTION OF A PREFERRED EMBODIMENT

Figure 1:
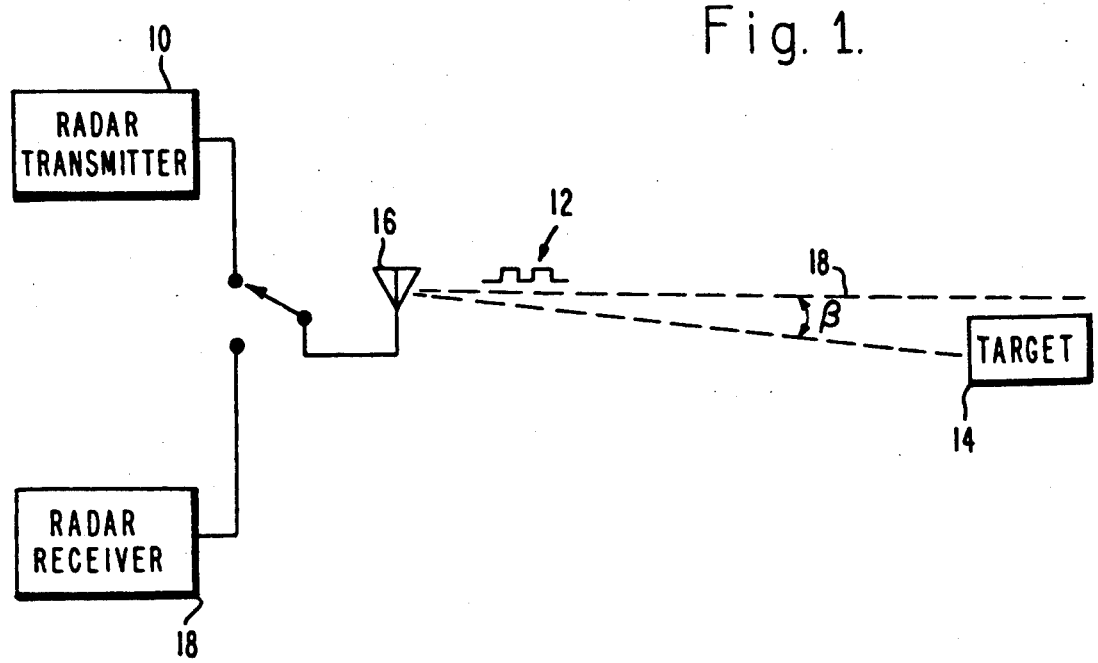
FIG. 1 is a function block schematic of the receiver portion of a radar guidance system with which the present invention is most advantageously employed.

As shown in FIG. 1, a radar guidance tracking system is seen to generally include a radar transmitter 10 which directs a series of pulses 12 toward a target 14 where they are reflected back toward the receiving antenna 16. Conventionally, the antenna 16 is the same antenna that is used for the sending operation with return echoes being received by receiver 18 and processed in between the sending pulses It is a primary purpose of a tracking system to determine the angle B which exists between the boresight 20 of the radar and the actual target 14. In a way well known in the art, upon determining this angle B the host apparatus, such as a missile, for example, can then be redirected so as to home in on the target.

Figure 3:
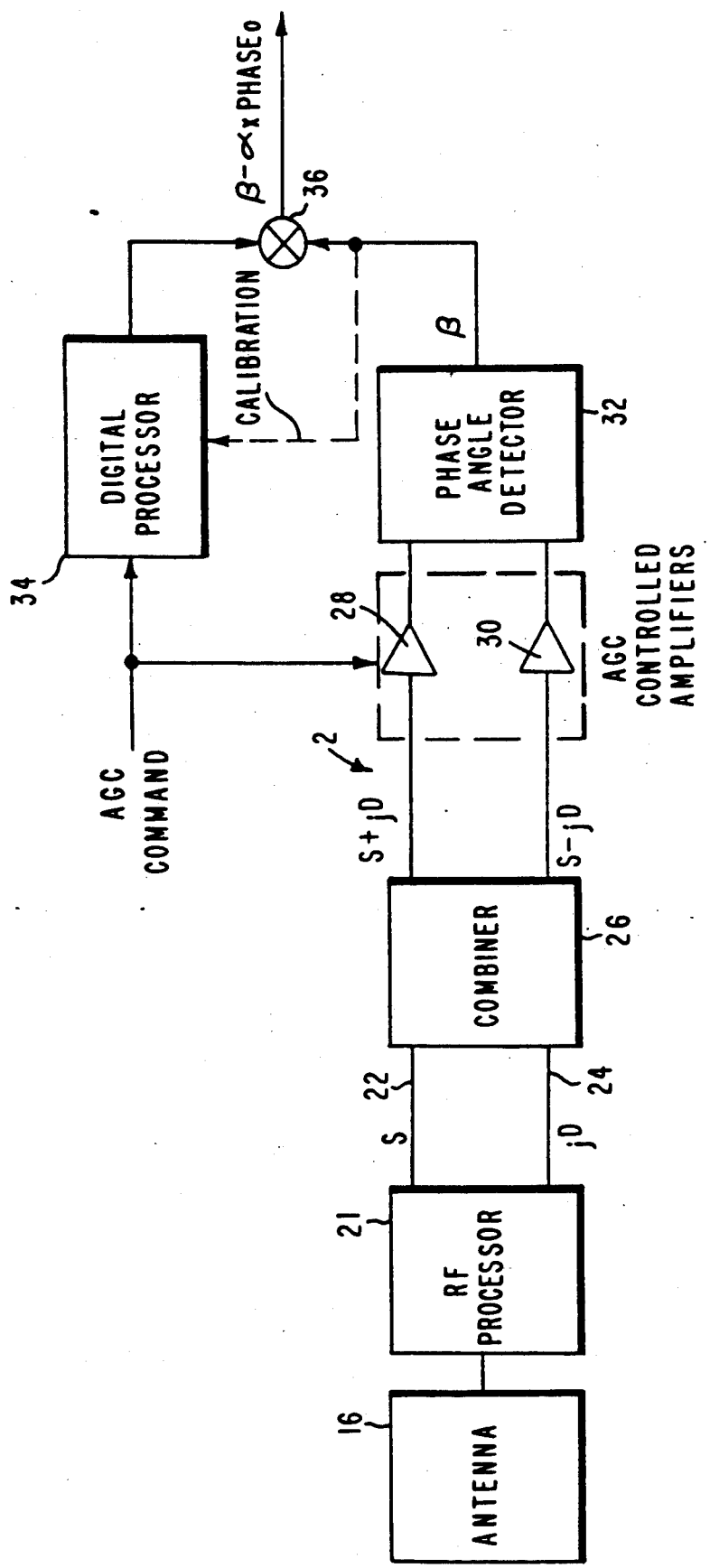
FIG. 3 is a circuit modification of the FIG. 1 receiver for eliminating automatic gain control hardware errors.

In the receiver 18, information obtained from the antenna 16 is split into two channels by an RF processor 21, namely, a first channel 22 for the summation of the echoes received (S) and a second channel 24 for the difference (D) of the signals, where D is 90° out of phase with S as indicated by the operator j (FIG. 3). In a phase dependent radar system, a so-called combiner 26 combines S and jD to provide a first channel output S+jD and a second channel output S-jD. The two channel outputs are then passed through separate automatic gain control (AGC) amplifiers 28 and 30 after which the information is processed by a phase angle detector 32 to determine, in a way well known in the art, the angle B of the target to boresight.

The AGC amplifiers 28, 30 can, in themselves, produce additional channel-to-channel phase differences which when impressed upon the original target signals received from the combiner 26 result in target angle measurement error. The error from the AGC will not necessarily be constant and, in fact, can be dependent upon the level of the AGC fluctuating as the AGC itself changes.

One approach to eliminating an AGC source of phase error that has been practiced heretofore is to switch the sign of jD in the combiner on alternate data collection periods so that in that way the target angles B obtained during these two switched periods would be subtracted from one another resulting in twice the antenna angle and, therefore, zeroing whatever error was induced by AGC phase error. Although effective, this requires that data being received by the antenna is from a stationary target over a relatively long period of time which from a practical standpoint would impose a prohibitive restraint on the sampling period.

Figure 2:
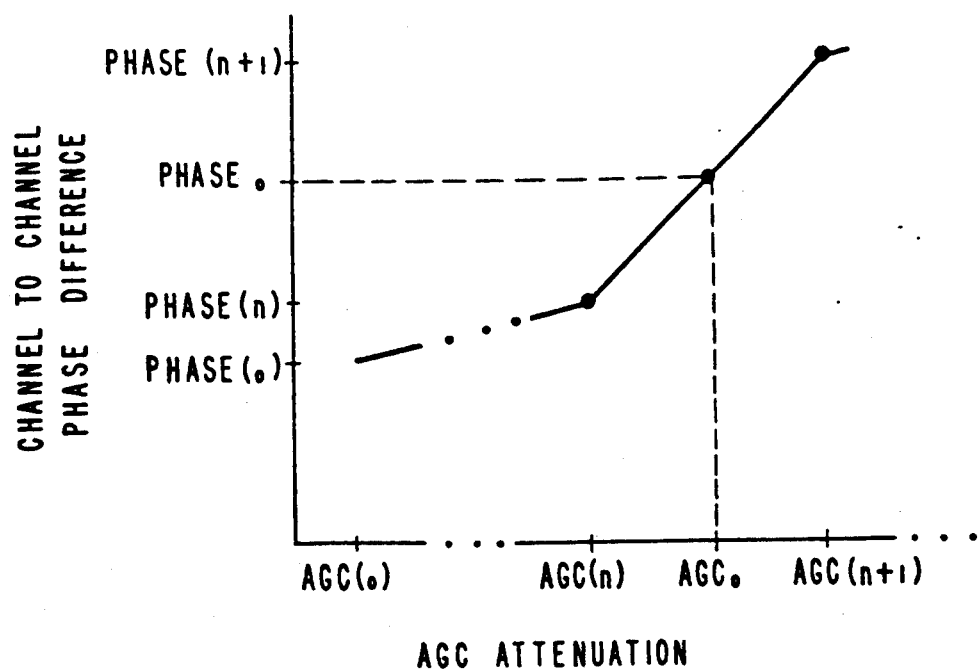
FIG. 2 depicts in graphical form typical automatic gain control hardware phase errors induced in the system of FIG. 1.

Turning now to FIG. 2 there is shown a graph of channel-to-channel phase differences versus AGC attenuation for a given radar guidance system. The graph data is obtained using a portion of flight dedicated to calibration by imposing a test signal as input to the radar processor with the two channels 22 and 24 being configured so that only S data is used (i.e., jD is set to zero). Since both channels receive the same signal input, any phase difference between the two channels is provided by the AGC hardware. Phase differences are then determined in the phase angle detector 32 with the same signal processing used for target angle determinations and measurements being taken for a range of AGC attentuation settings:

$$AGC(o), \ldots AGC(n), AGC(n+1), \ldots$$

Referring to both the graph of FIG. 2 and the system schematic of FIG. 3, the AGC attenuation at the time of flight is AGC and the angle B computed by the phase angle detector 32 including AGC error is, $$\beta = \beta' + \alpha \times PHASE(AGC_o)$$

where $\beta'$ is the true angle.

The digital processor 34 by linear interpolation of the stored values of phase angles and AGC attenuation obtained during test and calibration runs derives an estimated phase error (PHASEo) as follows:

$$PHASE_o = PHASE(n) + \left[ \frac{PHASE(n+1) - PHASE(n)}{AGC(n+1) - AGC(n)} \times (AGC_o - AGC(n)) \right]$$

Before the target angle B is reported to the missile guidance circuitry (not shown), the estimated error, $\alpha \times PHASE_o$, is subtracted at 36 resulting in, $$\beta' \alpha [PHASE(AGC_o) - PHASE_o]$$

Since $\beta'$ is the true target angle to boresight (i.e., without AGC error), the resulting error is reduced to, $$AGC\ Error - \alpha[PHASE(AGC_o) - PHASE_o]$$

Although the invention is described in connection with a preferred embodiment, it is to be understood that modifications may be made that are within the spirit of the invention and within the ambit of the appended claims.

What is claimed is:

1. A method of correcting for AGC amplifier contributed errors in the receiver of a phase dependent radar system having a first channel where the sum S of signals received are provided and a second channel where the difference D of signals received are provided, comprising:
   applying a test signal of known characteristics to the receiver with the second channel set to D = 0;
   measuring phase values rendered by the receiver when the AGC amplifier attenuation is modified over a plurality of different values; and
   algebraically adding selected test phase values to measured target phase values, said selected test phase values corresponding to actual AGC amplifier attenuation existing during said measuring of target phase values.

2. A method as in claim 1, in which the algebraic adding includes linear interpolation by a digital computer of phase test values and AGC attenuation to provide an estimated phase error which is algebraically mixed with target phase values.

3. A method as in claim 2, in which the digital computer stores the measured phase values and AGC attenuation when D = 0, selects a stored value of AGC and measured phase on each side of an actual instantaneous value of AGC and computes an estimate of the instantaneous phase error $PHASE_o$ by use of the algorithm, $$PHASE_o = PHASE(n) + \left[ \frac{PHASE(n+1) - PHASE(n)}{AGC(n+1) - AGC(n)} \times (AGC_oAGC(n)) \right]$$

where AGC is the instantaneous AGC attenuation and the other factors are stored PHASE and AGC values, and an estimated actual angular error contributed by AGC calculated as, $$a \times PHASE_o$$

where $\alpha$ is a constant for converting phase angles to spatial angles.

4. A phase independent radar guidance system for correcting AGC-induced angle measurement errors in which radar return signals are summed and fed along a first (S) channel, differenced and fed along a second (D) channel, which channels then form separate S+jD and S-jD signals that pass through AGC amplifiers to energize a phase angle detector the output of which is a target angle off boresight with AGC error, comprising:
   a digital computer with a plurality of stored values of phase measurements made with D=O and corresponding AGC attenuation values, and instantaneous values of AGC attenuation being provided to the computer, said computer being commanded to calculate an output, $$\alpha \times PHASE_o$$

where $\alpha$ is a constant for converting phase angles to spatial angles, and PHASE is an estimated AGC phase error;
   means fed by both the computer output and the output of the phase detector for providing a difference value equal to the corrected target angle.

* * * * *